United States Patent [19]

René et al.

[11] Patent Number: 5,211,359
[45] Date of Patent: May 18, 1993

[54] LANDING GEAR FOR AERODYNES, WITH CROSSPIECES IN COMPOSITE MATERIAL

[75] Inventors: Alande D. René, Chateauneuf-les-Martigues; Frédéric Balayn, Vitrolles; Claude Bietenhader, Lambesc, all of France

[73] Assignee: Aerospatiale Societe Nationale Industrielle, Paris, France

[21] Appl. No.: 875,461

[22] Filed: Apr. 29, 1992

[30] Foreign Application Priority Data

May 6, 1991 [FR] France ................ 91 05524

[51] Int. Cl.⁵ ............................................ B64C 25/52
[52] U.S. Cl. ............................ 244/108; 244/100 R; 244/17.17
[58] Field of Search ............... 244/100 R, 108, 109, 244/104 R, 104 L, 17.11, 17.17

[56] References Cited

U.S. PATENT DOCUMENTS

| 2,346,010 | 4/1944 | Cowey | 244/100 R |
| 2,641,423 | 6/1953 | Harriman | 244/100 R |
| 3,193,221 | 7/1965 | Victorian et al. | 244/100 R |
| 4,196,878 | 4/1980 | Michel | 244/108 |
| 4,270,711 | 6/1981 | Cresap et al. | 244/100 R |
| 4,544,116 | 10/1985 | Shwayder | 244/108 |
| 4,558,837 | 12/1985 | Mens et al. | 244/108 |
| 4,645,143 | 2/1987 | Coffy | 244/100 R |

FOREIGN PATENT DOCUMENTS

| 0143690 | 6/1985 | European Pat. Off. |
| 1272208 | 10/1960 | France. |
| 1578594 | 8/1969 | France. |

*Primary Examiner*—Sherman Basinger
*Assistant Examiner*—Christopher P. Ellis
*Attorney, Agent, or Firm*—Nikaido Marmelstein Murray & Oram

[57] ABSTRACT

Landing gear for aerodynes and especially helicopters comprising two lateral members (2) for contact with the ground being linked to the fuselage of the aerodyne by at least two crosspieces (3, 4). These crosspieces (3, 4) are produced as a bundle (7) of unidirectional synthetic fibers sheathed by a skin (8) of tissues of fibers which are crossed with respect to the unidirectional fibers of the bundle (7). The extremities (9) of the crosspieces are embedded in the lateral members (2) for contact with the ground. The structural links between the crosspieces (3, 4) and the fuselage of the aerodyne (H) allow the pivoting of the crosspieces (3, 4) about transverse axes of the aerodyne (H).

15 Claims, 4 Drawing Sheets

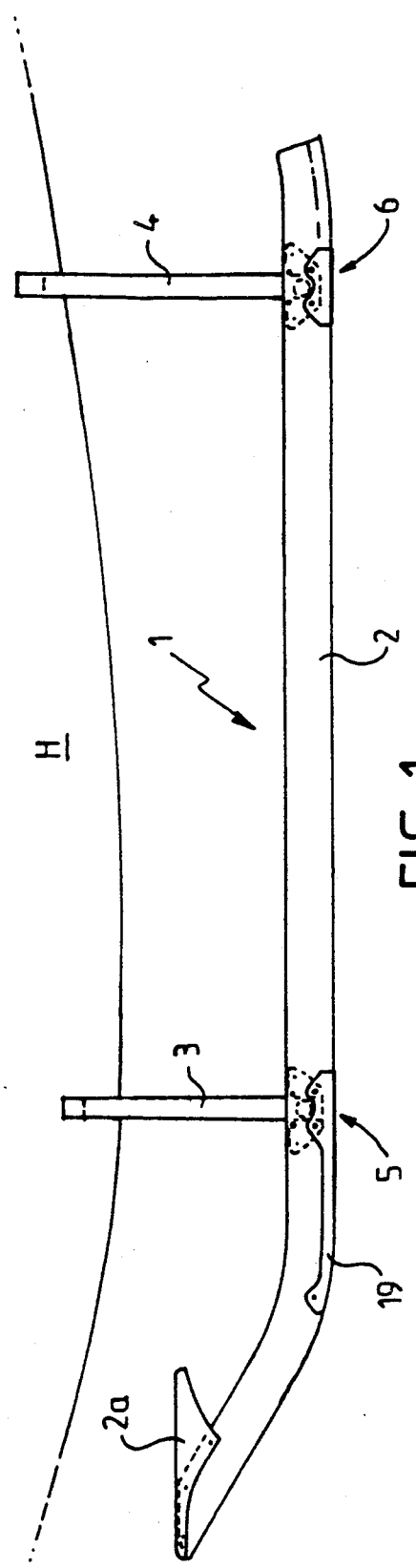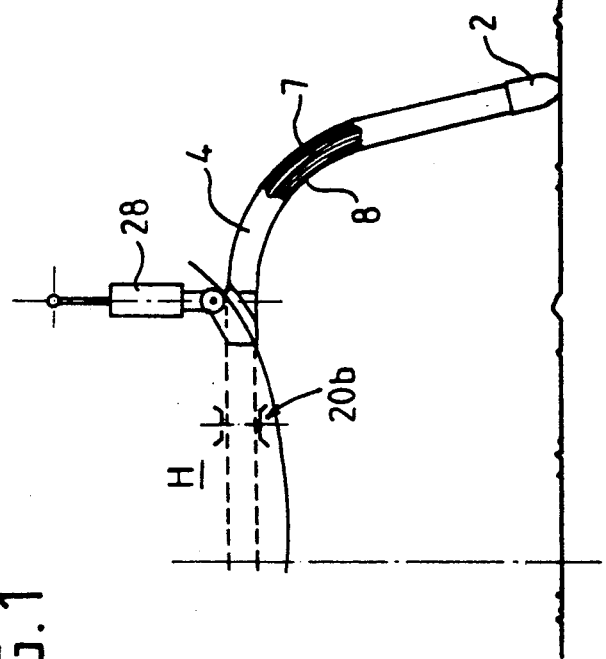

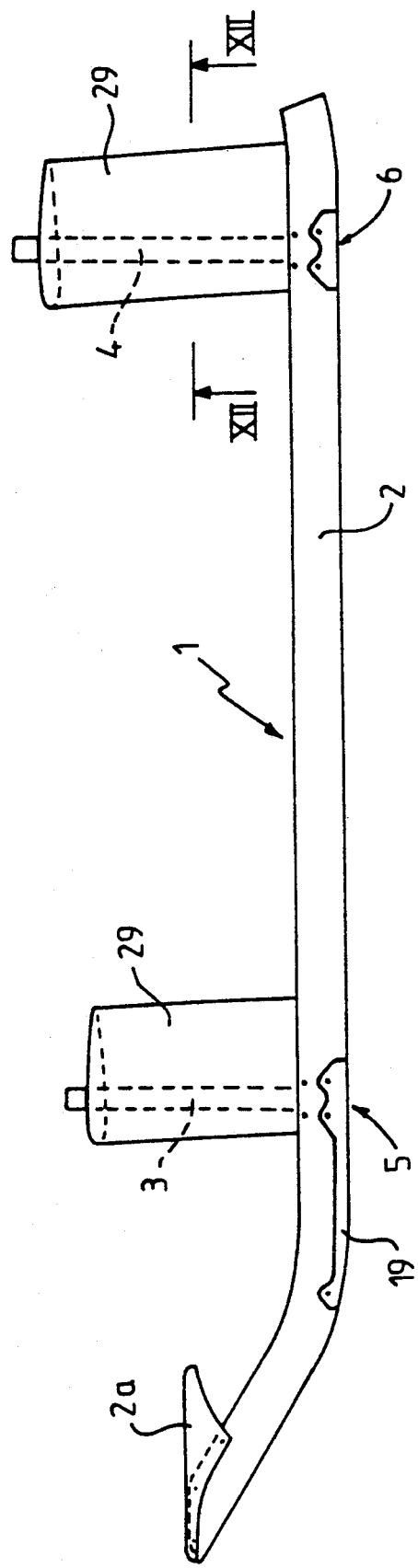
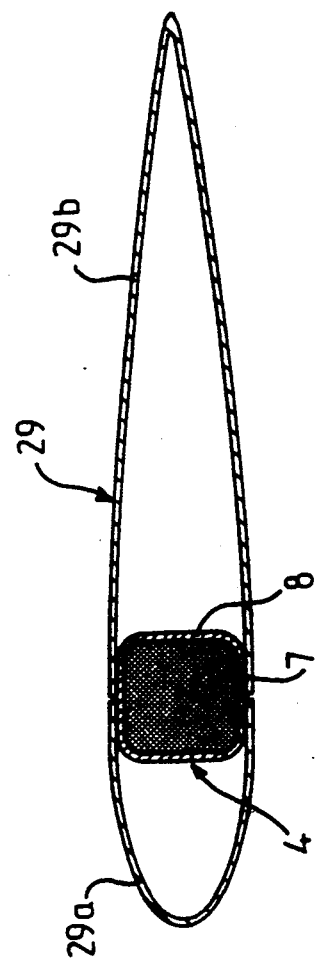
FIG. 11
FIG. 12

LANDING GEAR FOR AERODYNES, WITH CROSSPIECES IN COMPOSITE MATERIAL

FIELD OF THE INVENTION

The present invention relates to a landing gear with skids or similar members for contact with the ground, such as skis or floats, whose crosspieces or arches are made of composite material. Such a landing gear is intended to equip aerodynes and especially helicopters.

DESCRIPTION OF THE PRIOR ART

Conventionally, landing gears with skids or similar contact members, such as skis, floats, etc., mainly comprise two such members, linked together and to the fuselage of the aerodyne by two crosspieces in the shape of arches, whose lateral branches bear on the skids, which are themselves provided sc as to come into contact with the surface receiving the aerodyne. In the present description, the term "arch" or "crosspiece" will be used indiscriminately to describe this part of the landing gear. In the case of a helicopter especially, these crosspieces can also be associated with hydraulic dampers intended to damp the oscillations permitted by the landing gear when the aircraft is on the ground and the rotor is turning, so as to avoid the cabin of the helicopter entering into resonance on its landing gear.

On landing, the impact energy is absorbed by elastic and plastic deformation of the legs of the crosspieces and of the links between the fuselage of the helicopter and said crosspieces. Currently, these legs are produced in steel or in another alloy chosen for its good deformation properties.

This type of landing gear is not without certain drawbacks. In particular, it is common for landings at high vertical speeds, or "hard" landings, to plastically deform crosspieces and skids, which it then becomes necessary to replace as soon as the permanent deformations suffered by the gear no longer leave any margin before rupture. This is the source of significant additional expense.

Moreover, if the alloys in which these crosspieces are produced are chosen for their high deformation at rupture, on the contrary, the forces which they resist are rapidly saturated in the plastic phase, such that the slightest landing at a slightly too high vertical speed transmits to the cabin of the aerodyne a load factor close to the saturation value and appears "hard", especially where a cabin of low mass is involved.

Additionally, these load factors exceed, under maximum landing conditions, the load factors anticipated in flight. In view of this fact, a part of the structure of the aerodyne is over-dimensioned, since it is dimensioned as a function of the landing and not the flight parameters.

These landing gears can also sustain significant corrosion, especially inside the tubes of which they are made up, which requires them to be changed regularly. Also, the tubes of said crosspieces made of steel are sometimes processed at high temperatures. By reason of the difficulties in forming the tubes, the initial geometry of the landing gears can be difficult to obtain uniformly.

In order to remedy the drawbacks of metal gears with skids, it has already been proposed to produce the crosspieces of the landing gears in composite materials. By way of example, mention may be made especially of the landing gear described in the French patent of the applicant published under number FR-A-2,554,210, whose crosspieces are flexible beams made of laminated composite material. These beams are constituted by sole plates, linked in pairs by webs which are perpendicular to them. These beams are associated with elastomeric blocks interposed between said sole plates and intended to partly absorb the deformation energy of said sole plates when said beams are loaded on landing. The skids are embedded in sleeves which terminate the crosspieces at their extremities. The linking of the crosspieces to the fuselage, which is partly provided by an interposition of an elastomeric sleeve, allows, especially during sliding landings by helicopters, a limited pivoting of said crosspieces about transverse axes of the helicopter and relative angular deformations of the crosspieces with respect to the fuselage of the aircraft.

GENERAL DESCRIPTION OF THE INVENTION

The present invention itself proposes a landing gear with crosspieces in composite material, which makes it possible to overcome the abovementioned drawbacks of the conventional rigid landing gear and which is of a novel type.

In particular, the material in which the crosspieces of the landing gear according to the invention are produced is a laminated material which possesses a high elasticity and which exhibits the advantage of being easily shaped. The use of such a laminated material for the deformable structure of a landing gear proposed by the invention makes it possible to give it a high capacity of elastic absorption of energy during landings in extreme conditions of vertical speeds at impact.

Thus, the subject of the present invention is a landing gear for an aerodyne, and especially for a helicopter, of the type comprising two lateral members for contact with the ground such as skids, skis, floats or similar members, said members being linked together and to the fuselage of the aerodyne by at least two crosspieces wherein:

- each of the crosspieces is a curved beam constituted by a monolithic laminated material of high-strength fibers agglomerated by thermosetting synthetic resin,
- the cross section of each crosspiece is polygonal and substantially constant,
- the crosspieces are constituted by a core formed by longitudinal fibers, surrounded by a shell of tissues whose threads are oriented at plus or minus 45° with respect to the longitudinal fibers,
- the members for contact with the ground are rigid, hollow and closed profiled sections whose two lateral walls are parallel and vertical,
- the crosspieces are, at their extremities, rigidly embedded onto the members for contact with the ground and are fixed at the lower part of the structure of the fuselage of the aerodyne by an articulated link permitting limited rotation of the crosspieces about parallel transverse axes and relative angular deformations of the crosspieces with respect to the structure in the vertical plane and in the horizontal plane.

Advantageously, the longitudinal fibers and the tissues of the crosspieces are constituted by glass fibers.

Preferably, the thermosetting synthetic resin agglomerating the synthetic fibers is a resin of the EPOXY type. The hollow profiled sections constituting the strengthening part of the members for contact with the ground can be metal, preferably in aluminum alloy and obtained by extrusion.

Advantageously, the cross-section of a crosspiece is, especially in the region of its extremities, substantially square with rounded edges.

Preferably also, the embedding of the crosspieces onto the hollow profiled sections constituting the strengthening part of the members for contact with the ground is produced by penetration of the extremity of the crosspiece inside the profiled section and integration of the lateral faces of the crosspiece onto the sides of the profiled section by being screwed or bolted through. The embedded extremities of the crosspieces can be reinforced by sleeves constituted by successive layers of multidirectional tissues of fibers agglomerated by thermosetting synthetic resin and by the fact that the screws of the bolts passing through are arranged through said sleeves and distributed on either side of the extremities of the crosspieces.

The hollow profiled section constituting the strengthening part of the members for contact with the ground can be reinforced in the region of its link with the extremities of each crosspiece by spacers interposed between said sleeves and the inner walls of the hollow profiled section.

The means of linking each crosspiece under the lower part of the fuselage structure of the aerodyne comprises sleeves in an elastomer associated with collars for fixing the crosspieces onto the fuselage, said sleeves allowing, by virtue of their elasticity, relative angular movement between said fuselage and said crosspiece during bending loading of said crosspieces, as well as limited pivoting of the crosspieces with respect to the said collars during torsional loading of said crosspieces in the course of landing by the aerodyne.

The rear crosspiece can be linked to the fuselage of the aerodyne by the agency of two anti-ground-resonance dampers arranged on either side of the fuselage; the front crosspiece can be linked to the fuselage of the aerodyne by the agency of two anti-ground-resonance dampers arranged on either side of the fuselage.

Advantageously also, each leg of the crosspieces is at least partially surrounded over its part which extends from the fuselage of the aerodyne as far as the member for contact with the ground with which it is integrated, by a fairing which is aerodynamically shaped in profile. A fairing which is aerodynamically shaped in profile may be constituted by two parts, one at the leading edge and the other at the trailing edge, which are two half-shells in laminated material fixed onto the legs of the crosspieces. The half-shells, which are shaped in profile, of an aerodynamic fairing are constituted by tissues of glass fibers whose threads are woven at plus or minus 45° and whose fibers are agglomerated by thermosetting synthetic resin.

In the case where the members for contact with the ground are tubular skids, said skids may be reinforced in line with their link with the cross pieces by anti-wear plates, advantageously in stainless steel sheet, matching the lower shape of said skids.

BRIEF DESCRIPTION OF THE DRAWINGS

The description which follows of a particular embodiment of the invention is given in a purely illustrative and not at all limiting way, with reference to the attached drawings, in which:

FIG. 1 is a diagrammatic side view of a landing gear in accordance with the invention.

FIG. 2 is a front half-view of the front crosspiece of the landing gear of FIG. 1.

FIG. 3 is a front half-view of the rear crosspiece of the landing gear of FIG. 1.

FIG. 11 is a view similar to FIG. 1 of a landing gear in which the legs of the crosspieces are equipped with fairings which are aerodynamically shaped in profile.

FIG. 12 is a sectional view along line XII—XII of FIG. 11.

DESCRIPTION OF THE PREFERRED EMBODIMENTS

Figure 4:
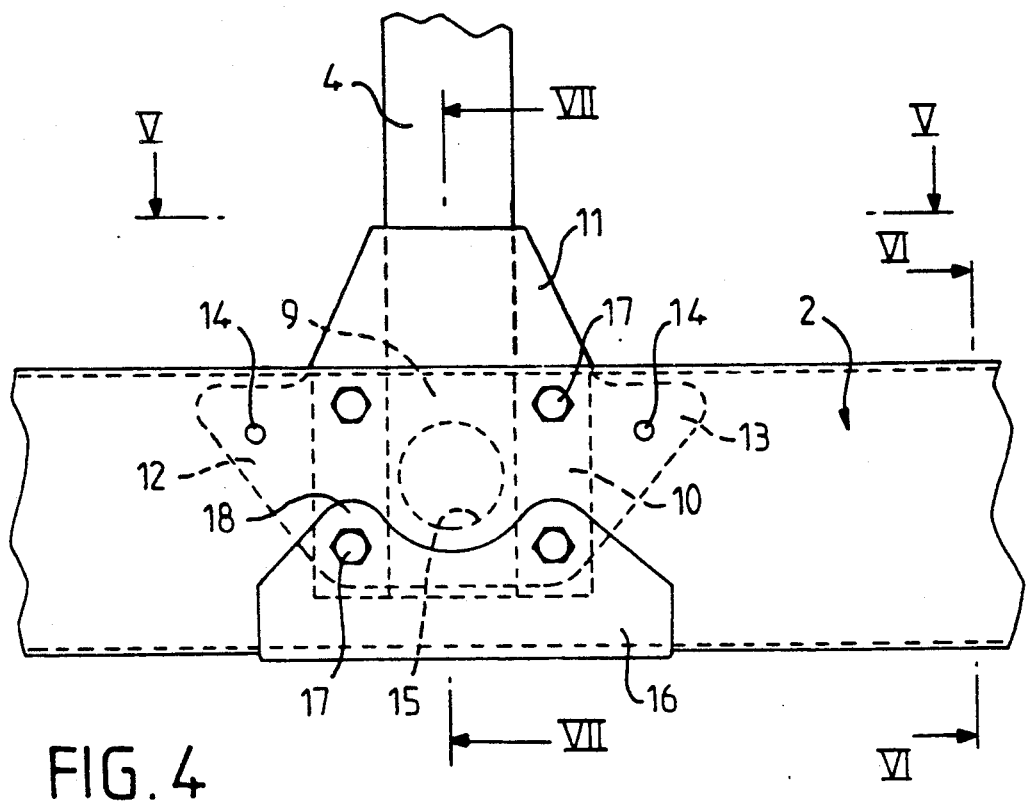
FIG. 4 is a view of a detail of FIG. 1, representing a link between a leg of a crosspiece and a skid of the landing gear.
Figure 5:
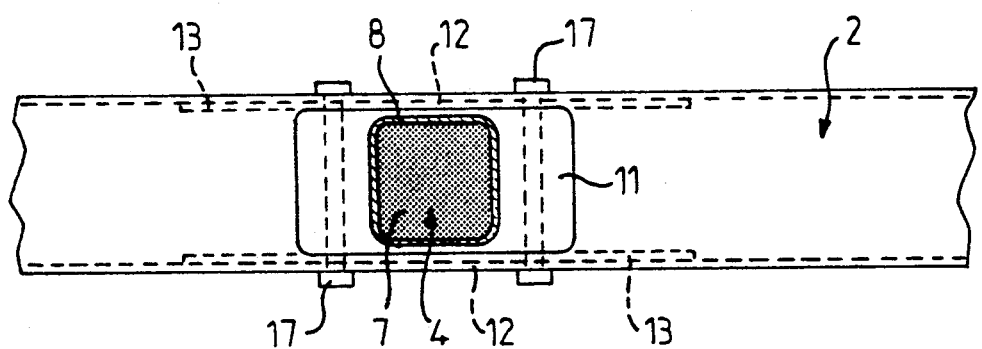
FIG. 5 is a sectional view along line V—V of FIG. 4.

In FIG. 1 it can be seen that a landing gear in accordance with an embodiment of the invention, referred to as a whole by 1, mainly comprises two skids 2 linked together and to the fuselage of an aerodyne referred to by H, by two front and rear crosspieces referred to respectively by 3 and 4. The latter are integrated respectively at 5 and 6 onto skids 2.

The rear crosspiece 4 is linked, conventionally, to a strong rear frame (not shown) closing off the central part of the fuselage of the aerodyne H. The front crosspiece 3 is, in turn, fixed to a strong front frame of the fuselage.

As can be seen more particularly in FIGS. 2 and 3, the crosspieces 3 and 4 each have the shape of a trapezoidal arc with a connection of the two sides by an arc of a circle. Their straight sections are square with rounded edges, the rear crosspiece 4 being of slightly greater dimensions than the front crosspiece 3. This polygonal shape, advantageously square, of the crosspieces 3 or 4 is particularly advantageous; in particular it considerably simplifies the fixing of the crosspieces 3 or 4 onto the fairings and the interface with the skids 2.

These crosspieces are produced in a solid, homogeneous material, which is a bundle 7 of unidirectional glass fibers agglomerated with an epoxy resin and surrounded by a skin 8 which is a weave of glass fibers with plies crossing at plus or minus 45° with respect to the direction of the fibers of the bundle 7. The solid, constant cross-section of the crosspieces makes it possible to avoid matching shapes and internal infilling on assembly. The unidirectional fibers of the bundle 7 permit the crosspiece to respond to the bending loadings which it undergoes, while the skin of crossed fibers 8 permits the return of said crosspieces toward their rest position when they are loaded in torsion, especially during a sliding landing.

The front and rear crosspieces 3 and 4 are respectively linked by linking means 20a and 20b to the fuselage of the helicopter H. The rear crosspiece 4 is associated with two anti-ground-resonance dampers 28, distributed on either side of the helicopter H. If necessary, the front crosspiece 3 can also be equipped with two anti-ground-resonance dampers.

A comparison table is given below (Table 1) of the parameters relating to the elastic and plastic behavior of materials conventionally used to date to produce landing gears, as well as those relating to the bundle of glass fibers proposed by the invention.

TABLE 1

|  | Steel | Aluminum alloy | Bundle of fibers of glass/epoxy resin |
|---|---|---|---|
| Density | 7.8 | 2.8 | 2.1 |
| Modulus (hb) | 20000 | 7000 | 5500 |
| Elastic $\sigma$ (hb) | 120 | 30 | 160 |
| Elastic W (kj/kg) | 0.46 | 0.23 | 11.4 |
| Rupture $\sigma$ (hb) | 138 | 48 | 160 |
| Elongation | 13% | 10% | 2.9% |
| Plastic W | 20.5 | 13.4 | — |
| Total W (kj/kg) | 21 | 14 | 11.4 |

It clearly emerges from this table that the elastic absorption capacity of the bundle of glass fibers proposed by the invention is much better than that of metal alloys in which gears are conventionally produced. Also, it should be noted that the useful elongation of the bundle of glass fibers, which is 2.9% instead of 13% possible to produce the crosspieces with much flatter cross sections, which reduces the aerodynamic drag of the landing gear accordingly.

Figure 6:
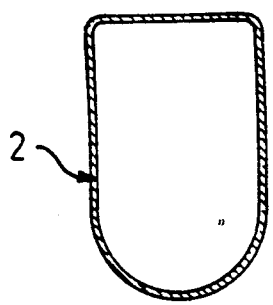
FIG. 6 is a sectional view along line VI—VI of FIG. 4.
Figure 7:
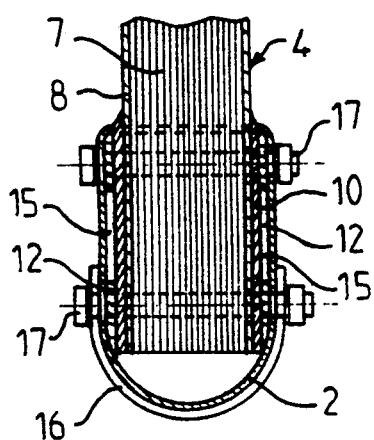
FIG. 7 is a sectional view along line VII—VII of FIG. 4.

Referring now more particularly to FIGS. 4 to 7, it is seen that a link between the crosspiece 4 and a skid 2 is produced by embedding the extremity 9 of said crosspiece 4 into said skid 2. In the region of this extremity 9, said crosspiece 2 is reinforced by a sleeve 10 in multidirectional tissues of glass fibers which surrounds it and exhibits a mainly parallelepipedal rectangular shape. This sleeve 10 is connected to the part of said crosspiece 4 which protrudes with respect to the skid 2, by a pyramid section 11 widening out of said crosspiece 4, as far as said sleeve 10. The skid 2 is a tubular skid produced in extruded and curved aluminum alloy, whose cross-section has, as can be seen in FIG. 6 a rectangular shape, whose base in contact with the ground is a semicircular arc. The face of said skid 2 in contact with the ground is thus a half-cylinder, while the face of said skid 2 which is opposite it is a flat face equipped especially in line with the crosspiece 4, with a cutout in its thickness, corresponding substantially to the straight section of the reinforcing sleeve 10. This cutout extends parallel to the direction along which said skid 2 extends. The lateral faces of said sleeve 10, of the skid 2 and of the crosspiece 4, are thus parallel.

Inside, said skid is equipped, in the region of said link 6, with two spacers 12 interposed between the lateral faces of said skid 2 and the lateral faces of the sleeve 10. These spacers 12 have mainly trapezoidal shapes, whose large bases are arranged towards the edges of the skid 2 which are closest to the aerodyne H, these large bases being parallel to said edges. The height of these spacers 12 corresponds to the height of the sleeve 10 and of the crosspieces 4 inside the skid 2 and is less than the height of the skid 2. Each spacer 12 is bonded onto a lateral face of the skid 2 and held fixed on this face by two safety rivets 14 each arranged respectively in the region of one of the wings 13 of said spacer 12. At its center, a spacer 12 is equipped with a recess 15 which is a hole intended to lighten it in a non-working area.

The means of linking 6 are also associated with an anti-wear shoe 16 which partially surrounds the skid 2 with which it is associated, in the region of its cylindrically-arched part intended to be in contact with the ground. Such a anti-wear shoe 16 is produced in steel. These various parts, namely the crosspiece 4 and the sleeve 10, the spacers 12, the skid 2, the anti-wear shoe 16, are linked by means of four screws 17 which pass through the skid 2 from its outer lateral face (with respect to the landing gear as a whole) to its inner lateral face. These four screws are distributed on either side of the crosspiece 4 extending into the thickness of the sleeve 10 without passing through said crosspiece 4. They are all intended to work approximately equivalently. The peening forces of the bolts associated with these four screws 17 are mainly borne by the inner spacers 12, which additionally serve to reinforce the flexural strength of the skid 2 with which they are associated. The heads of the screws 17 bear on the outer faces of the skid 2, while the nuts (not shown) associated with these screws 17 bear on the inner face of said skid 2. Between the heads or bolts of the two screws 17 of a link 6 which are furthest from the fuselage of the aerodyne and the faces of the skid 2 are inserted tabs 18 which extend the anti-wear shoe at its upper part, said screws 17 passing through said tabs 18.

The links 5 between the front crosspiece 3 and the skids 2 are substantially similar to the links 6 which have just been described. The only difference is in the anti-wear shoes 19 (FIG. 1) with which said links 5 are associated; the shoes 19 extend toward the front of the skids 2, practically as far as their front curved parts which carry the treads 2a.

Figure 8:
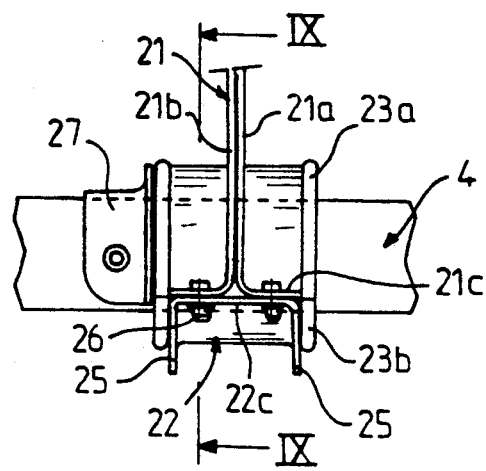
FIG. 8 is a front view with cutaway of a detail of a link between a crosspiece and the fuselage of the aerodyne.
Figure 9:
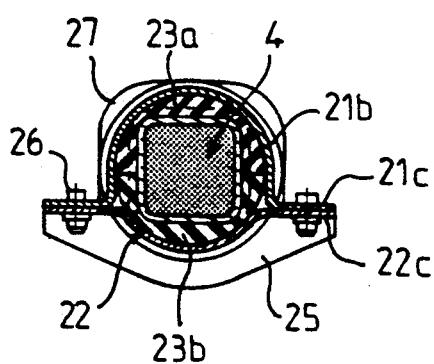
FIG. 9 is a sectional view along line IX—IX of FIG. 8.
Figure 10:
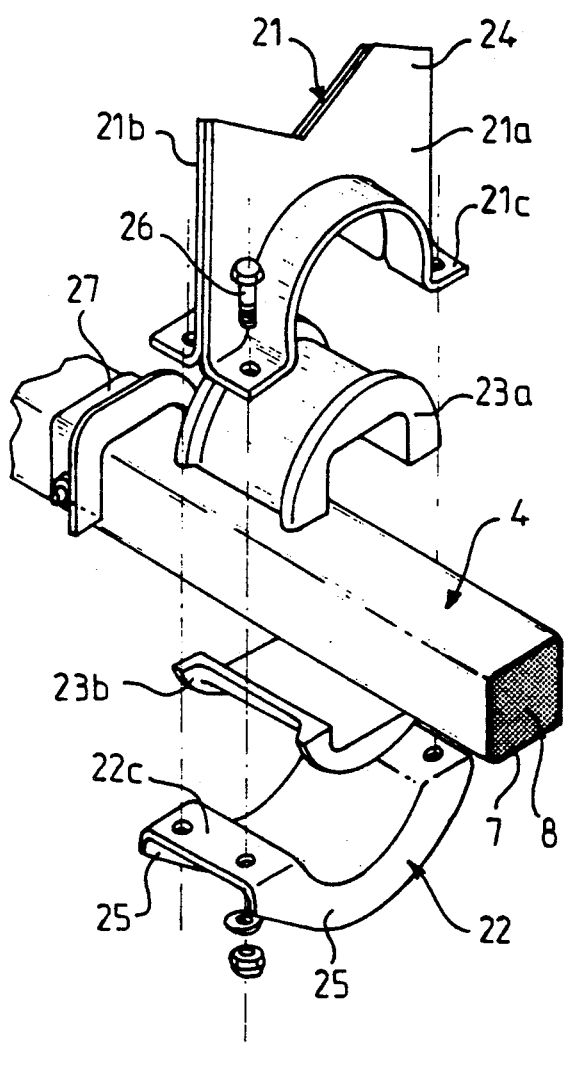
FIG. 10 is an exploded view in perspective of the link in FIG. 8.

The structural link between the crosspieces 3 and 4 and the aerodyne H has been represented in greater detail in FIGS. 8 to 10. This link is produced for each crosspiece 3 or 4 by two fixings denoted respectively by 20a and 20b, formed in the upper part of each side of the aircraft. These fixings 20a or 20b allow rotation of the crosspieces 3 or 4 about transverse axes of the aircraft H, which makes it possible to avoid or to limit the torsion of the crosspieces on landing. Thus, especially in the case of a sliding or symmetric landing, the moment introduced in the region of the crosspieces 3 or 4/skids 2 fixing is in no way blocked or taken up by the fixing in the region of the structure of the aircraft H, but balanced out by the longitudinal bending of the skids 2. This link also permits bending deformations of the crosspieces in the vertical plane and in the horizontal plane.

The means of linking of the fixings 20a and 20b mainly comprise upper and lower half-collars denoted respectively by 21 and 22 and assembled together by screwing means 26 in the region of their contact halfflats 21c and 22c. These two half-collars 21 and 22 clamp, when they are in place, an elastomer sleeve 23 with a cylindrical external surface, whose inner wall matches the shape of the crosspiece 3 or 4 with which it is associated. This sleeve 23 is produced in two halfshells 23a and 23b. It allows the relative angular movements between crosspieces 3 or 4 and the structural support during bending of said crosspiece 3 or 4. The half-collar 21 is extended in its upper part by a wall 24 which is perpendicular to the axis of said half-collar 21 and by which the fixing 20a and 20b as a whole is articulated so as to pivot on the structure of the aircraft H. The lower half-collar 22 is bordered laterally by two rims 25 forming a protective cheek for the means 26 referred to above which are necessary for the screw arrangement. Each fixing 20a, 29b is also associated with a stop 27 integral with the corresponding crosspiece and determining the fixing point on the latter.

As has been shown in greater detail in FIGS. 11 and 12, the legs of the crosspieces 3 or 4 can be surrounded, at their parts which extend from the fuselage of the helicopter H as far as the skid 2 which is associated with this leg, by a fairing 29 is aerodynamically shaped in profile. Such a fairing 29 is constituted in two parts: one, denoted by 29a, forming the leading edge of said fairing, the other, denoted by 29b forming the trailing edge. These two parts are half-shells in a laminated material bonded onto the faces of the crosspieces. These half-shells 29a and 29b which are shaped in profile are constituted by tissues of glass fibers whose fibers are oriented at plus or minus 45° from one another and which are agglomerated with a thermosetting synthetic resin.

The reference marks, inserted after the technical characteristics mentioned in the claims, have the sole aim of facilitating comprehension of the latter, and do not in any way limit their scope.

What is claimed is:

1. A landing gear for an aerodyne comprising two lateral members for contact with the ground aligned with a longitudinal axis of the aerodyne, said members being linked together and to the fuselage of the aerodyne by at least two crosspieces wherein:

each of the crosspieces is a curved beam constituted by a monolithic laminated material of high-strength fibers agglomerated by thermo-setting synthetic resin, the cross-section of each crosspiece is polygonal and substantially constant and in the region of its extremities substantially square with rounded edges, the crosspieces are constituted by a core formed by longitudinal fibers, surrounded by a shell of tissues whose threads are oriented at plus or minus 45° with respect to the longitudinal fibers, the members for contact with the ground are rigid, hollow and closed profiles whose two lateral walls are parallel and vertical, the crosspieces are, at their extremities, rigidly embedded onto the members for contact with the ground by penetration of the extremity of the crosspiece inside the profile and integration of the lateral faces of the crosspiece onto the sides of the profile by securing members extending therethrough, and the crosspieces are fixed at the lower part of the structure of the fuselage of the aerodyne by an articulated link permitting limited rotation of the crosspieces about parallel transverse axes of the aerodyne and relative angular deformations of the crosspieces with respect to the structure in the vertical plane and in the horizontal plane.

2. The landing gear as claimed in claim 1, wherein the longitudinal fibers and the tissues of the crosspieces are constituted by glass fibers.

3. The landing gear as claimed in any one of claims 1 or 2, wherein the thermosetting synthetic resin agglomerating the synthetic fibers is a resin of the EPOXY type.

4. The landing gear as claimed in claim 1, wherein the hollow profiles constituting the strengthening part of the members for contact with the ground are metal.

5. The landing gear as claimed in claim 1, wherein the embedded extremities of the crosspieces are reinforced by sleeves constituted by successive layers of multidirectional tissues of fibers agglomerated by thermosetting synthetic resin and wherein the securing members passing through are arranged through said sleeves and distributed on either side of the extremities of the crosspieces.

6. The landing gear as claimed in claim 5, wherein the hollow profile constituting the strengthening part of the members for contact with the ground is reinforced in the region of its link with the extremities of each crosspiece by spacers interposed between said sleeves and the inner walls of the hollow profile.

7. The landing gear as claimed in claim 1, wherein the means of linking each crosspiece under the lower part of the fuselage structure (H) of the aerodyne comprises sleeves in an elastomer associated with collars for fixing the crosspieces onto the fuselage, said sleeves allowing, by virtue of their elasticity, relative angular movement between said fuselage and said crosspiece during bending loading of said crosspieces, as well as limited pivoting of the crosspieces with respect to said collars during torsional loading of said crosspieces in the course of landing by the aerodyne.

8. The landing gear as claimed in claim 1, wherein the rear crosspiece is linked to the fuselage (H) of the aerodyne by the agency of two anti-ground-resonance dampers arranged on either side of the fuselage.

9. The landing gear as claimed in claims 1 or 8, wherein the front crosspiece is linked to the fuselage (H) of the aerodyne by the agency of two anti-ground-resonance dampers arranged on either side of the fuselage.

10. The landing gear as claimed in any one of claim 1, wherein each leg of the crosspieces is at least partially surrounded over its part which extends from the fuselage of the aerodyne (H) as far as the member for contact with the ground with which it is integral, by a fairing which is aerodynamically shaped in profile.

11. The landing gear as claimed in claim 10, wherein the fairing which is aerodynamically shaped in profile is constituted by two parts, one at the leading edge and the other at the trailing edge, which are two half-shells in laminated material fixed onto the legs of the crosspieces.

12. The landing gear as claimed in claim 11, wherein the half-shells, which are shaped in profile, of an aerodynamic fairing are constituted by tissues of glass fibers whose threads are woven at plus or minus 45° and whose fibers are agglomerated by thermosetting synthetic resin.

13. The landing gear as claimed in claim 1, wherein, in the case where the members for contact with the ground are tubular skids, said skids are reinforced in line with their link with the crosspieces by anti-wear plates. matching the lower shape of said skids.

14. The landing gear as claimed in claim 1, wherein the aerodyne is a helicopter.

15. The landing gear as claimed in claim 4, wherein the hollow profiles are made of aluminum alloy and obtained by extrusion.

* * * * *